United States Patent
Kim et al.

(10) Patent No.: US 7,295,627 B2
(45) Date of Patent: Nov. 13, 2007

(54) DIGITAL BROADCAST TRANSMISSION SYSTEM OF IMPROVED RECEPTABILITY AND SIGNAL PROCESSING METHOD THEREOF

(75) Inventors: Joon-son Kim, Seoul (KR); Dong-hoon Lee, Suwon-si (KR); Jung-won Kwak, Seoul (KR); Chan-sub Park, Incheon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 662 days.

(21) Appl. No.: 10/887,310

(22) Filed: Jul. 9, 2004

(65) Prior Publication Data
US 2005/0047519 A1    Mar. 3, 2005

Related U.S. Application Data

(60) Provisional application No. 60/485,737, filed on Jul. 10, 2003.

(30) Foreign Application Priority Data
Sep. 8, 2003    (KR) ............... 10-2003-0062836

(51) Int. Cl.
    *H04L 27/00*    (2006.01)
(52) U.S. Cl. .................................. 375/295
(58) Field of Classification Search ........ 375/260, 375/270, 285, 295, 301; 370/208, 500; 455/63.1, 455/65, 68
    See application file for complete search history.

(56) References Cited

U.S. PATENT DOCUMENTS 5,381,449 A * 1/1995 Jasper et al. ............... 375/298
5,574,496 A    11/1996 Nielsen et al.
7,154,915 B1 * 12/2006 Ushirokawa et al. ...... 370/528
2002/0071053 A1    6/2002 Wittig
2006/0034378 A1 *  2/2006 Lindskog et al. .......... 375/260

FOREIGN PATENT DOCUMENTS

| KR | 1999-0058954 A | 7/1999 |
| KR | 1999-0082892 A | 11/1999 |
| KR | 2000-0034435 A | 6/2000 |
| KR | 2001-0055543 A | 7/2001 |
| KR | 2001-0010456 A | 2/2002 |
| WO | WO 92/09174 A1 | 5/1992 |
| WO | WO 93/09622 A1 | 5/1993 |

* cited by examiner

*Primary Examiner*—Khanh C. Tran
(74) *Attorney, Agent, or Firm*—Sughrue Mion Pllc.

(57) ABSTRACT

A digital broadcast transmission system and a signal processing method thereof offers improved receptability. The digital broadcast transmission system includes an error correction encoding unit for encoding an input signal according to a predetermined error correction method; a synchronous signal inserting unit for inserting a synchronous signal in the input signal after the error correction encoding; a first pilot inserting unit for inserting a first pilot signal in the input signal which contains the synchronous signal therein; a second pilot inserting unit for inserting a plurality of second pilot signals in the input signal which contains the first pilot signal therein; a pulse shaping filter for pulse shaping the input signal with the first and the second pilot signals according to a predetermined roll-off factor; and a radio frequency (RF) unit for transmitting the pulse-shaped input signal to a transmission channel band. By inserting a plurality of pilot signals in the transmitted data, problems associated with disappearance of only pilot signal due to poor channel environment can be overcome.

6 Claims, 7 Drawing Sheets

< 8-VSB FREQUENCY SPECTRUM >

DIGITAL BROADCAST TRANSMISSION SYSTEM OF IMPROVED RECEPTABILITY AND SIGNAL PROCESSING METHOD THEREOF

CROSS-REFERENCE TO RELATED APPLICATIONS

This application claims the benefit of U.S. Provisional Patent Application No. 60/485,737 filed Jul. 10, 2003 and Korean Patent Application No. 2003-62836 filed Sep. 8, 2003 in the Korean Intellectual Property Office, the disclosures of which are incorporated herein by reference.

BACKGROUND OF THE INVENTION

1. Field of the Invention

The present invention relates to a digital broadcast transmission system, and more particularly, to a digital broadcast transmission system offering improved receptability at a receiving end, and a signal processing method thereof.

2. Description of the Related Art

Figure 1:
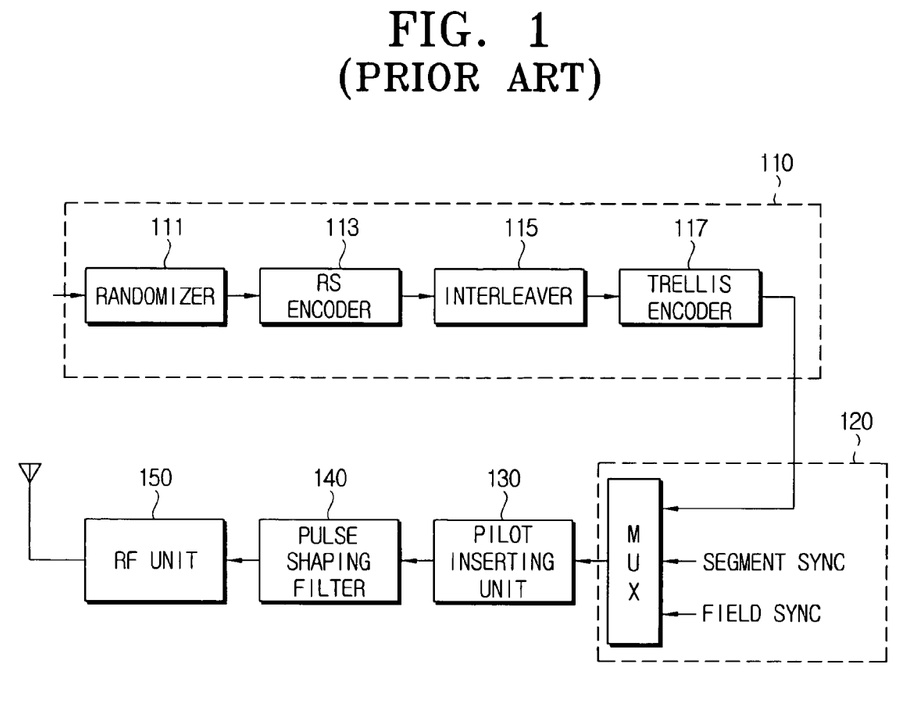
FIG. 1 is a schematic block diagram of a conventional 8-VSB transmission system.

FIG. 1 is a schematic block diagram of an 8-VSB transmission system. The 8-VSB transmission system comprises an error correction encoding unit 110, a synchronous signal inserting unit 120, a pilot inserting unit 130, a pulse shaping filter 140 and a radio frequency (RF) unit 150.

The error correction encoding unit 110 comprises a randomizer 111, a Reed-Solomon (RS) encoder 113, an interleaver 115 and a Trellis encoder 117.

The randomizer 111 randomizes an incoming sequence of MPEG2-TS data packets, and the RS encoder 113 adds predetermined bytes of RS parities for error correction of data packets. The interleaver 115 carries out convolution interleaving, and the Trellis encoder 117 carries out Trellis encoding at a 2/3 ratio.

The synchronous signal inserting unit 120 inserts segment sync and field sync with respect to the data packets which are error-correction encoded.

The pilot inserting unit 130 generates one pilot signal by adding a predetermined DC value to 8-level symbol data.

The pulse shaping filter 140 carries out pulse shaping with respect to a VSB signal containing a pilot signal therein, by the filter which has a predetermined roll-off factor.

The RF unit 150 up-converts data into RF channel domain, and transmits the converted data via antenna.

Figure 2:
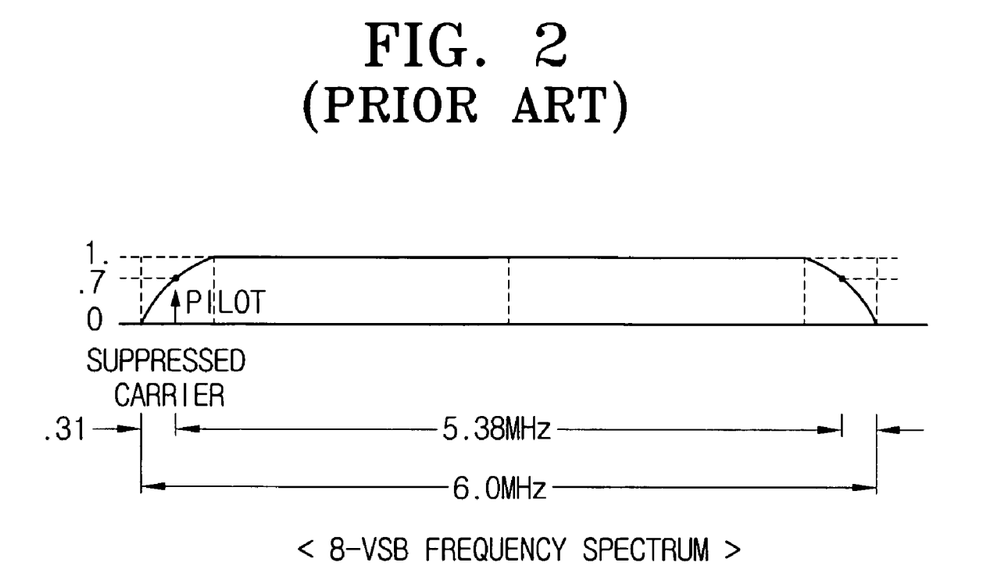
FIG. 2 is a frequency spectrum of an 8-VSB signal.

FIG. 2 is a frequency spectrum of an 8-VSB signal which is pulsed-shaped at the pulse shaping filter 150 of the 8-VSB transmission system of FIG. 1. As shown, the 6 MHz channel bandwidth consists of at least 5.38 MHz of bandwidth for the transmission of the 8-VSB signal, and excess bandwidths of 6 KHz (0.31 KHz×2) at both sidebands of the 5.38 MHz bandwidth, according to the roll-off factor of the pulse shaping filter. There is one pilot signal in the low frequency band. The pilot signal as inserted is used in the receiving system in the processes such as carrier frequency recovery.

The conventional 8-VSB transmission system as described above, however, has a problem in decoding when the pilot signal disappears due to poor channel environments.

SUMMARY OF THE INVENTION

The present invention has been developed in order to solve the above drawbacks and other problems associated with the conventional arrangement. An aspect of the present invention is to provide a digital broadcast transmission system which improves a receptability at a receiving end even under deteriorated channel environments, and a signal processing method thereof.

The above aspects and/or other features of the present invention can be substantially achieved by providing a digital broadcast transmission system, comprising: an error correction encoding unit for encoding an input signal according to a predetermined error correction method; a synchronous signal inserting unit for inserting a synchronous signal in the input signal after the error correction encoding; a first pilot inserting unit for inserting a first pilot signal in the input signal which contains the synchronous signal therein; a second pilot inserting unit for inserting a plurality of second pilot signals in the input signal which contains the first pilot signal therein; a pulse shaping filter for pulse shaping the input signal with the first and the second pilot signals according to a predetermined roll-off factor; and a radio frequency (RF) unit for transmitting the pulse-shaped input signal to a transmission channel band.

The second pilot signal is inserted in at least one location corresponding to an analog signal existing in the transmission channel band. The second pilot signal is inserted in at least one location corresponding to a null signal generated from an analog signal rejection filter of the receiving end.

According to one aspect of the present invention, a signal processing method of a digital broadcast transmission system comprises the steps of: encoding an input signal according to a predetermined error correction method; inserting a synchronous signal in the input signal after the error correction encoding; inserting a first pilot signal in the input signal which contains the synchronous signal therein; inserting a plurality of second pilot signals in the input signal which contains the first pilot signal therein; pulse-shaping the input signal with the first and the second pilot signals according to a predetermined roll-off factor; and transmitting the pulse-shaped input signal to a transmission channel band.

The problem in the conventional system, which is associated with the use of only one pilot signal and disappearing of the only pilot signal, can be overcome by inserting a plurality of pilot signals in the transmitted signals, and as a result, a digital broadcast transmission system which offers more stabilized reception is provided.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
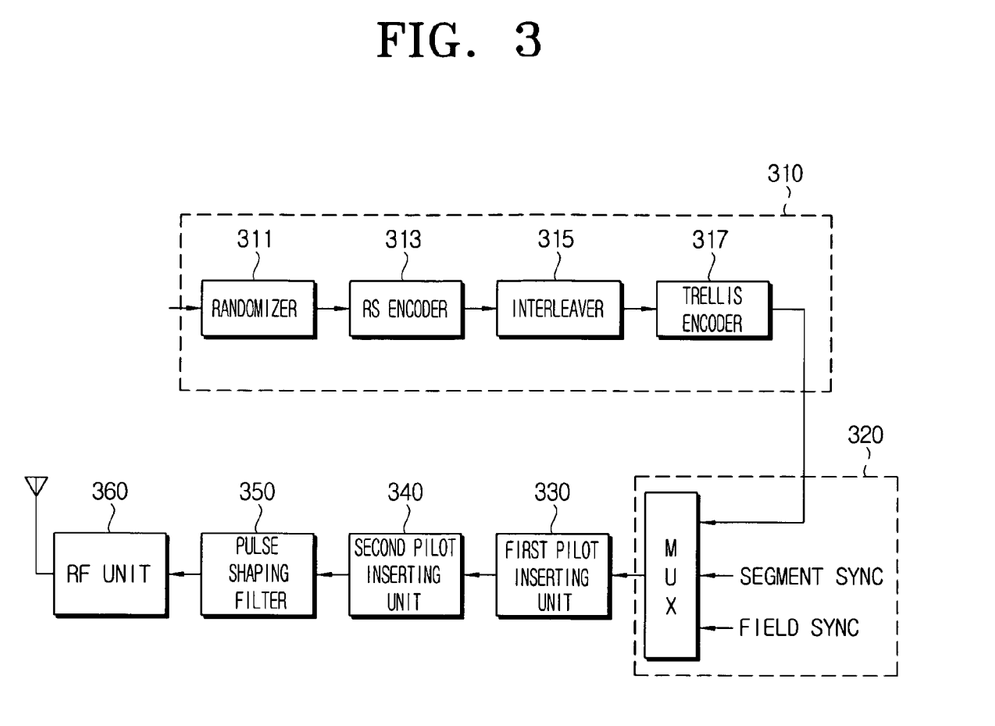
FIG. 3 is a schematic block diagram of a digital broadcast transmission system according to an embodiment of the present invention.

FIG. 3 is a schematic block diagram of a digital broadcast transmission system according to a certain embodiment of the present invention.

According to this embodiment of the present invention, a digital broadcast transmission system comprises an error correction encoding unit 310, a synchronous signal inserting unit 320, a first pilot inserting unit 330, a second pilot inserting unit 340, a pulse shaping filter 350 and a radio frequency (RF) unit 360.

The error correction encoding unit 310 comprises a randomizer 311, a RS encoder 313, an interleaver 315 and a Trellis encoder 317. The randomizer 311 randomizes the incoming sequence of MPEG2-TS data packets, and the RS encoder 313 adds predetermined bytes of RS parities to the incoming data packets for error correction. The interleaver 315 carries out convolution interleaving, and the Trellis encoder 317 carries out Trellis encoding at 2/3 ratio.

The synchronous signal inserting unit 320 inserts segment sync and field sync in the data packets which are error correction encoded.

The first pilot inserting unit 330 inserts one pilot signal by adding a predetermined DC value to the 8-level symbol data.

The second pilot inserting unit 340 inserts a plurality of pilot signals in predetermined locations. The predetermined locations correspond to the locations of null signals which are generated for the removal of visual (V), chrominance (C) and aural (A) signals.

The pulse shaping filter 350 carries out pulse shaping with respect to the signals containing pilot signals from the first and the second pilot inserting units 330 and 340, by the use of a filter having a predetermined roll-off factor.

The RF unit 360 up-converts data into RF channel band, and transmits the converted data to the transmission channel via an antenna.

Figure 4:
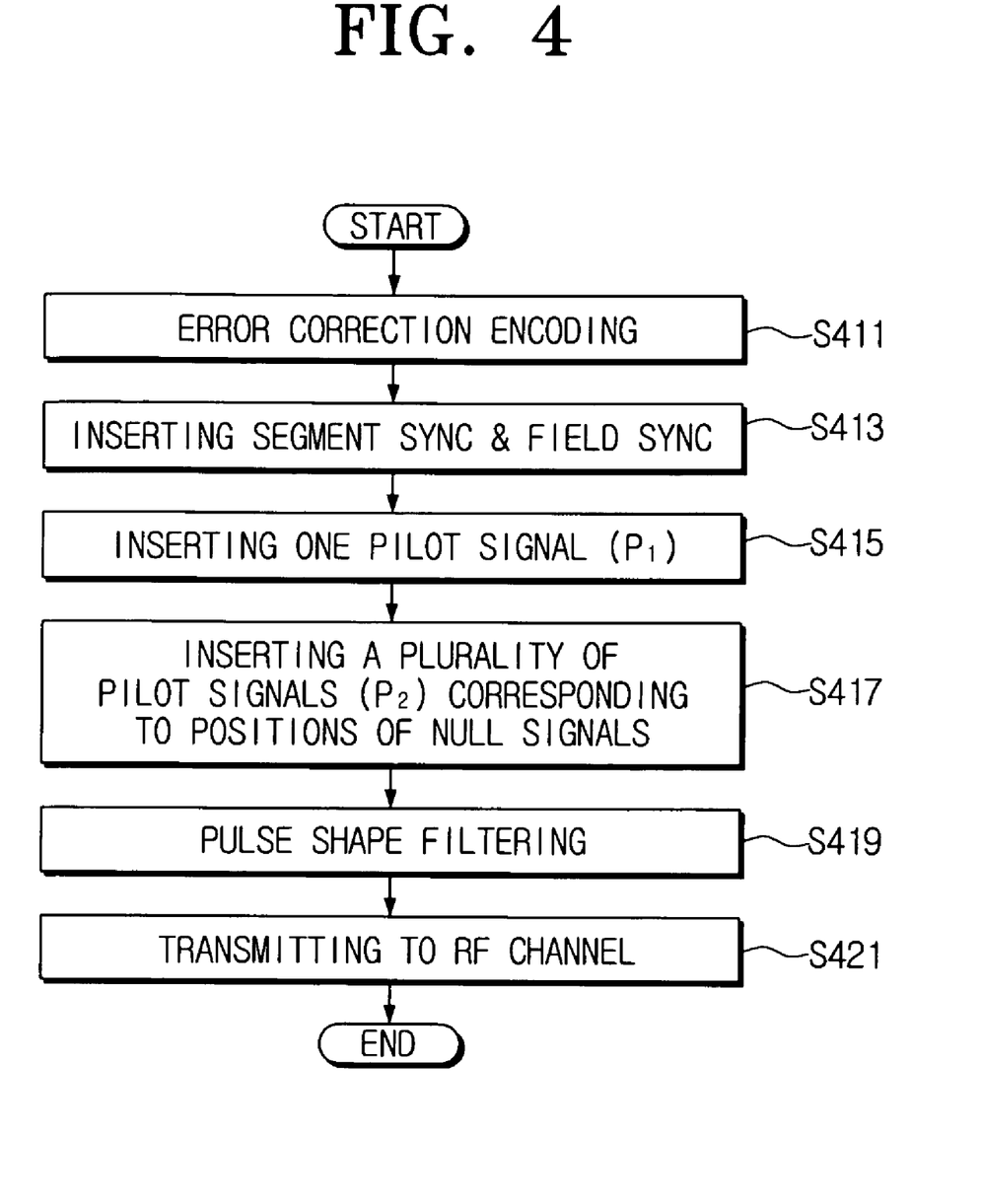
FIG. 4 is a flowchart illustrating the signal processing at the digital broadcast transmission system of FIG. 2 for an improved receptability at a receiving end.

FIG. 4 is a flowchart illustrating the signal processing at the digital broadcast transmission system of FIG. 3, and hereinbelow, the signal processing at the digital broadcast transmission system which inserts and uses a plurality of pilot signals, usable also in the existing receiving systems, will be described in detail with reference to FIGS. 4 and 5.

The MPEG2-TS data is randomized, RS-encoded, interleaved and Trellis-encoded at the error correction encoding unit 310 (step S411). The synchronous signals including segment sync and field sync are inserted in the signal from the error correction encoding unit 310 (step S413).

The first pilot inserting unit 330, as shown in FIG. 2, inserts one pilot signal in the low frequency band of the 8-VSB frequency spectrum, as is usually done in the existing 8-VSB method of FIG. 2 (step S415).

The second pilot inserting unit 340 inserts a plurality of pilot signals of predetermined sizes, in the locations of null signals which are generated at the analog signal rejection filter of the receiving system (step S417).

Figure 5:
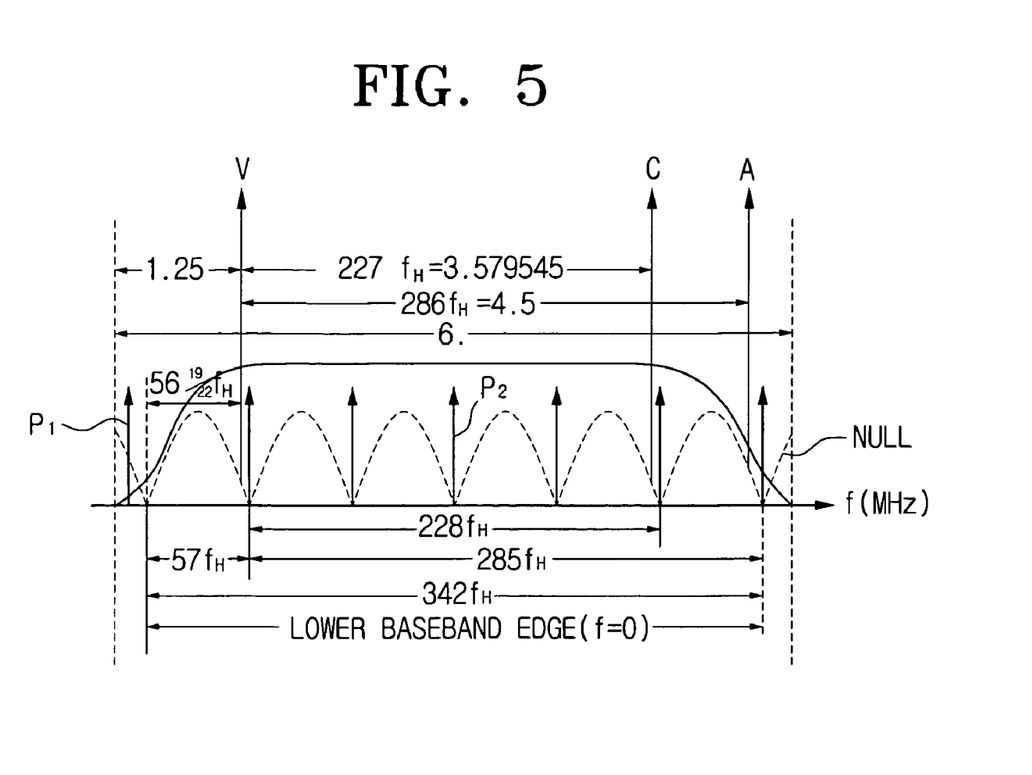
FIG. 5 is a frequency spectrum of the signal processed by the digital broadcast transmission system of FIG. 3.

As shown in FIG. 5, from the lowest band, an analog visual (V) signal is located near to the second null signal, and an analog chrominance (C) signal is located almost in the same position as the sixth null signal. An analog aural (A) signal is located near to the seventh null signal.

In other words, analog signals are removed by aligning the positions of three types of analog signals with the positions of null signals which are generated at the analog signal rejection filter. Also, referring to this, the system according to the present invention can be efficiently used in the existing receiving system, by aligning the position of the pilot signals by the second pilot inserting unit 340 with the positions of the null signals.

One or more than one pilot signals can be inserted in correspondence to the locations of the null signals, and therefore, problems associated with pilot disappearance due to degraded channel environments can be overcome. As a result, receptability improves and the system is stabilized.

As a next step, the pulse shaping filter 350 carries out shape filtering with respect to the signals containing a plurality of pilot signals based on a predetermined roll-off factor (step S419), and up-converts into signals in desired RF channel band and transmits the same to the transmission channel via an antenna (step S421).

When processed in the digital broadcast transmission system, the signals contain a plurality of pilot signals in addition to one pilot signal which is inserted in general manner, which leads to stabilized transmission of pilot signals under even poor channel environment and improved receptability at a receiving system.

Figure 6:
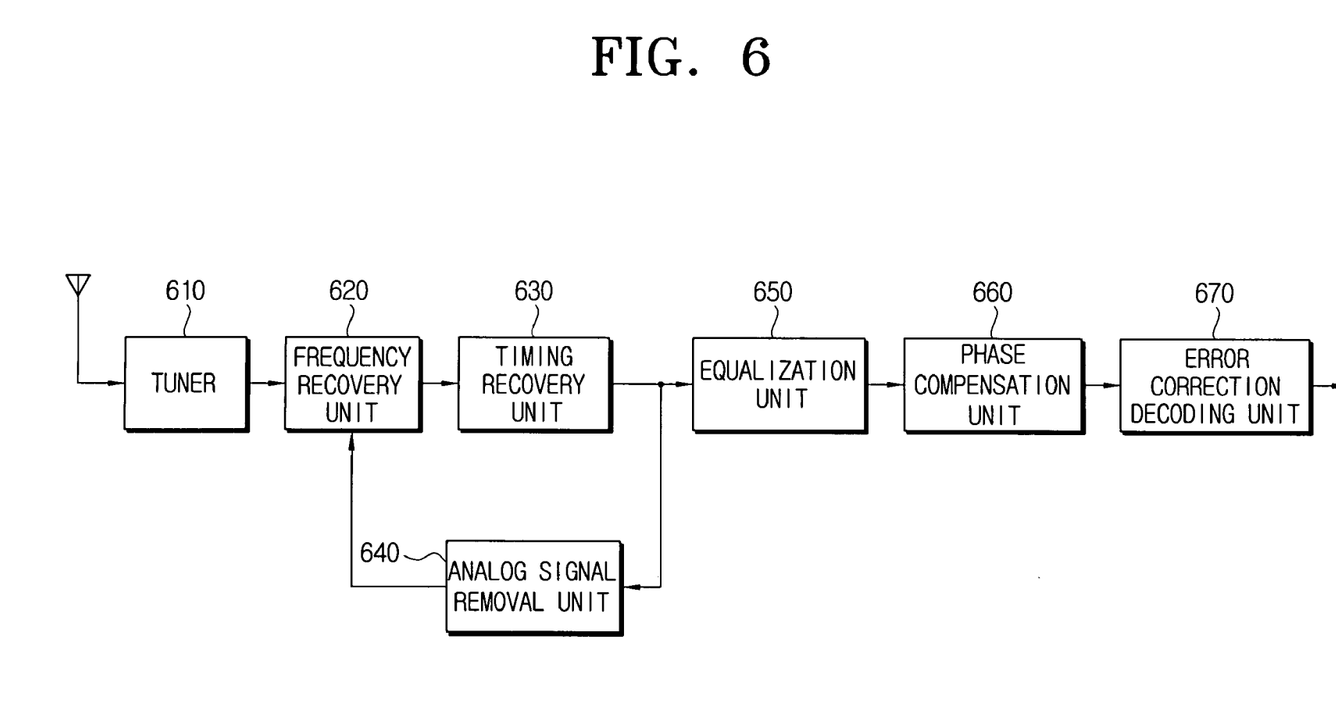
FIG. 6 is a schematic block diagram of a conventional 8-VSB receiving system.
Figure 7:
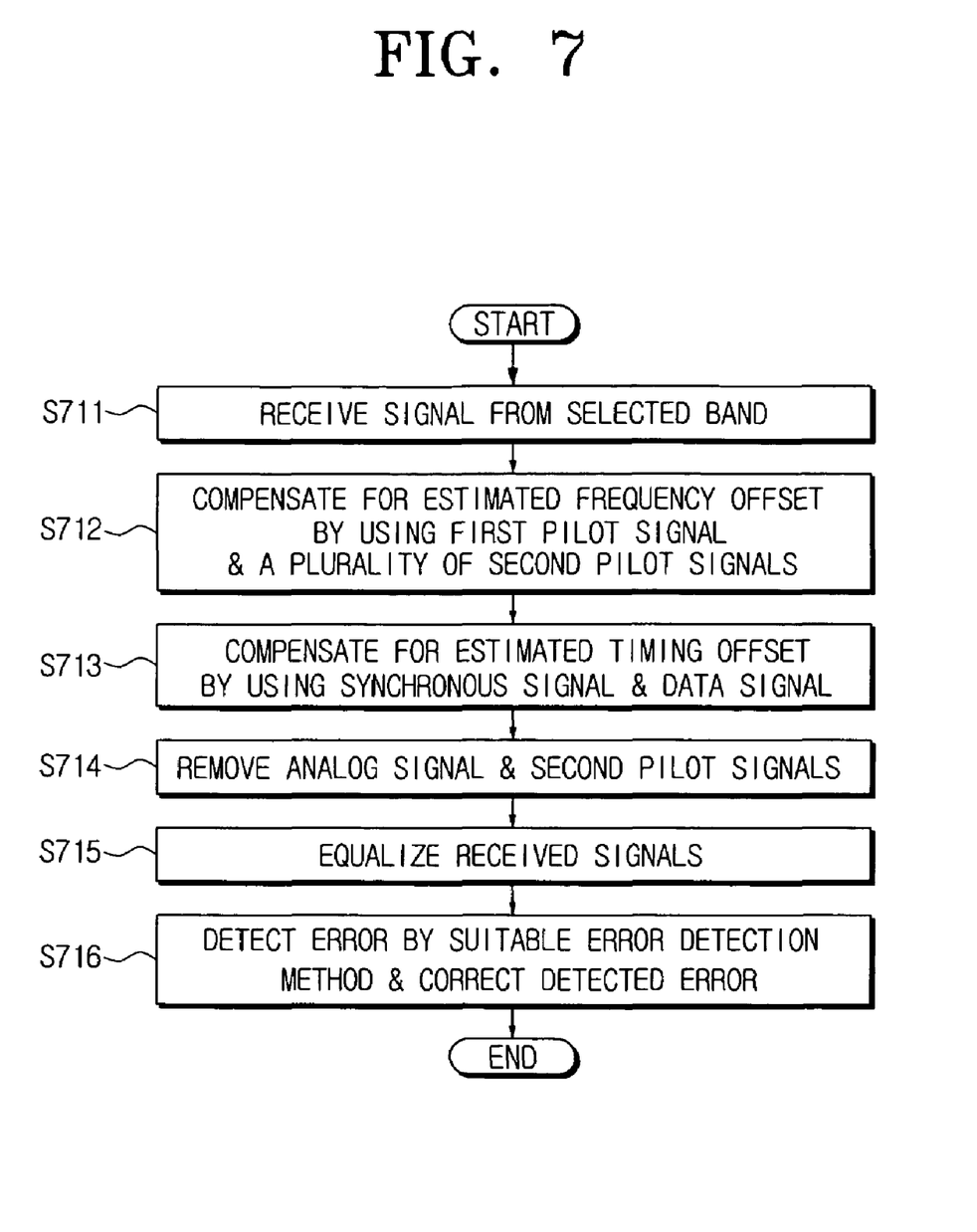
FIG. 7 depicts a flowchart illustrating the signal processing of the digital broadcast transmission system of FIG. 6 for an improved receptability at a receiving end.

FIG. 6 is a schematic block diagram of a general conventional digital broadcasting receiving system, and referring to FIGS. 6 and 7, it will be described in detail how the signals processed at the digital broadcast transmission system according to the present invention are suitably used in the conventional digital broadcasting receiving system.

The digital broadcasting receiving system comprises a tuner 610, a frequency recovery unit 620, a timing recovery unit 630, an analog signal removing unit 640, an equalization unit 650, a phase compensation unit 660 and an error correction decoding unit 670.

The tuner 610 receives a signal from a selected band (S711) and tunes to the received signal, and down-converts the received signals into baseband signals.

The frequency recovery unit 620 recovers frequency offset of the received signal, by using the plurality of pilot signals (S712) which are inserted by the first and the second pilot inserting units 330 and 340 (see FIG. 3).

The timing recovery unit 630 recovers timing offset of the received signals, by using the synchronous signals such as segment sync and field sync (S713).

Referring to FIG. 5, the analog signal removing unit 640 removes analog signals such as V, C and A signals from the received signals, by generating null signals in the positions corresponding to the analog signals. The plurality of pilot signals, which are inserted by the second pilot inserting unit 340 in the locations corresponding to the null signals, are removed together with the analog signals, and the signals are used in the conventional receiving system without a problem (S714).

An equalization unit 650 removes inter-symbol interference (ISI) from and equalizes the received signals (S715), and the phase compensation unit 660 compensates for phase error of the received signals.

The error correction decoding unit 670 carries out error correction decoding corresponding to the error correction encoding of the transmission system (S716). For example, the error correction decoding unit 670 may operate to perform by order of Trellis-decoding, de-interleaving, RS-decoding and de-randomization for the signals received through the error correction encoding unit 310 of the transmission system as shown in FIG. 3.

As described above in a few exemplary embodiments of the present invention, problems of the conventional digital broadcast transmission system, i.e., the problem associated with the use of only one pilot signal and disappearing of the only pilot signal in the conventional system, can be overcome by inserting a plurality of pilot signals in the transmitted signals, and as a result, a digital broadcast transmission system which offers more stabilized reception is provided.

Because pilot signals are stably transmitted even under poor channel environment, receptability at a receiving end is improved.

Secondly, the digital broadcast transmission system according to the present invention can be compatibility used with the conventional receiving system, by inserting a plurality of pilot signals in the locations where the null signals of the analog signal rejection filter of the receiving system exist.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A digital broadcast transmission system, comprising:
    an error correction encoding unit for encoding an input signal according to a predetermined error correction method;
    a synchronous signal inserting unit for inserting a synchronous signal in the input signal after the error correction encoding;
    a first pilot inserting unit for inserting a first pilot signal in the input signal which contains the synchronous signal therein;
    a second pilot inserting unit for inserting a plurality of second pilot signals in the input signal which contains the first pilot signal therein;
    a pulse shaping filter for pulse shaping the input signal with the first and the second pilot signals according to a predetermined roll-off factor; and
    a radio frequency (RF) unit for transmitting the pulse-shaped input signal to a transmission channel band.

2. The digital broadcast transmission system of claim 1, wherein the second pilot signal is inserted in at least one location corresponding to an analog signal existing in the transmission channel band.

3. The digital broadcast transmission system of claim 1, wherein the second pilot signal is inserted in at least one location corresponding to a null signal generated from an analog signal rejection filter of a receiving end of the transmission system.

4. A signal processing method of a digital broadcast transmission system, comprising the steps of:
    encoding an input signal according to a predetermined error correction method;
    inserting a synchronous signal in the input signal after the error correction encoding;
    inserting a first pilot signal in the input signal which contains the synchronous signal therein;
    inserting a plurality of second pilot signals in the input signal which contains the first pilot signal therein;
    pulse-shaping the input signal with the first and the second pilot signals according to a predetermined roll-off factor; and
    transmitting the pulse-shaped input signal to a transmission channel band.

5. The signal processing method of claim 4, wherein the second pilot signal is inserted in at least one location corresponding to an analog signal existing in the transmission channel band.

6. The signal processing method of claim 4, wherein the second pilot signal is inserted in at least one location corresponding to a null signal generated from an analog signal rejection filter of the receiving end.

* * * * *